United States Patent
Alnasri

(10) Patent No.: US 12,467,632 B2
(45) Date of Patent: Nov. 11, 2025

(54) HEATING APPARATUS

(71) Applicant: Wolf Pack Outdoors, LLC, Salt Lake City, UT (US)

(72) Inventor: Abdulrahman Alnasri, Farmington, UT (US)

(73) Assignee: Wolf Pack Outdoors, LLC, Salt Lake City, UT (US)

( * ) Notice: Subject to any disclaimer, the term of this patent is extended or adjusted under 35 U.S.C. 154(b) by 561 days.

(21) Appl. No.: 17/702,743

(22) Filed: Mar. 23, 2022

(65) Prior Publication Data
US 2023/0304668 A1 Sep. 28, 2023

(51) Int. Cl.
| | |
|---|---|
| F24C 1/16 | (2021.01) |
| A23B 4/052 | (2006.01) |
| A47J 37/07 | (2006.01) |
| F23B 30/00 | (2006.01) |
| F24B 9/00 | (2006.01) |

(52) U.S. Cl.
CPC ............... *F24C 1/16* (2013.01); *A23B 4/052* (2013.01); *A47J 37/0704* (2013.01); *A47J 37/0718* (2013.01); *F23B 1/30* (2013.01); *F24B 9/00* (2013.01); *A23V 2002/00* (2013.01)

(58) Field of Classification Search
CPC ....... A47J 37/079; A47J 37/0704; F24C 1/16; A23B 4/052; F23Q 7/02; F28D 17/005
USPC ............... 126/25 B, 9 R, 617–620, 9 B, 4
See application file for complete search history.

(56) References Cited

U.S. PATENT DOCUMENTS

| | | | |
|---|---|---|---|
| 1,483,420 A | 2/1924 | Ewing | |
| 2,221,098 A | 11/1940 | Joseph | |
| 2,240,367 A * | 4/1941 | Fernholtz | A01G 13/06 |
| | | | 126/541 |
| 4,351,314 A | 9/1982 | Morton | |

(Continued)

FOREIGN PATENT DOCUMENTS

| | | |
|---|---|---|
| CN | 204923099 U | 12/2015 |
| CN | 205860108 U | 1/2017 |

(Continued)

OTHER PUBLICATIONS (https://www.amazon.com/BBQ-Smoker-Box-Cold-Smoke/dp/B01N7G5C5X, first available on Amazon Dec. 8, 2016) (Year: 2016).*

(Continued)

*Primary Examiner* — Vivek K Shirsat
(74) *Attorney, Agent, or Firm* — Goff IP Law PLLC; Jared Goff

(57) ABSTRACT

A heating apparatus can include a fire cage defining a cage space containing heated fuel. The heating apparatus can also include a container configured to be supported by the fire cage at a container position, wherein the container is above at least a portion of the cage space. The container can be designed to hold burning fuel above the heated fuel. Also, a heating apparatus can be arranged to form a food grill, and the heating apparatus can be rearranged to form a fire cage configuration. A thermal store can be placed in a heat collecting position on a side of the fire cage in a first location to heat the thermal store. The thermal store can be moved away from the fire cage and can be positioned in a second location away from the fire cage to emit thermal energy to heat air around the second location.

9 Claims, 16 Drawing Sheets

(56) References Cited

U.S. PATENT DOCUMENTS

| | | | |
|---|---|---|---|
| 4,526,158 A * | 7/1985 | Lee | A47J 37/0763 |
| | | | 126/25 A |
| 4,621,608 A | 11/1986 | Lee | |
| 4,726,349 A | 2/1988 | Gehrke | |
| 5,329,917 A | 7/1994 | Young | |
| 5,404,864 A | 4/1995 | Kent, Jr. | |
| 5,785,046 A | 7/1998 | Colla | |
| 5,842,463 A | 12/1998 | Hall | |
| 6,035,768 A | 3/2000 | Kaufman | |
| 6,591,828 B1 | 7/2003 | Schneider | |
| 6,708,604 B1 | 3/2004 | Deichler, Jr. | |
| 6,883,512 B2 | 4/2005 | Esposito | |
| 7,107,983 B1 | 9/2006 | West | |
| 7,624,729 B2 | 12/2009 | Baranovski | |
| 7,934,494 B1 | 5/2011 | Schneider | |
| 8,079,302 B2 | 12/2011 | Giangrasso et al. | |
| 8,250,995 B2 | 8/2012 | Lee | |
| 8,261,731 B2 | 9/2012 | Marsh | |
| 8,312,807 B2 | 11/2012 | Martinez et al. | |
| 8,469,018 B1 | 6/2013 | West | |
| 8,701,649 B2 | 4/2014 | Kukuliyev | |
| 8,770,184 B2 | 7/2014 | Schneider | |
| 9,027,543 B2 | 5/2015 | Robb | |
| 9,038,620 B2 | 5/2015 | Brown | |
| 9,402,509 B2 | 8/2016 | Robb | |
| 9,420,913 B2 | 8/2016 | Despain et al. | |
| 9,445,690 B2 | 9/2016 | Handyside | |
| 9,464,811 B2 | 10/2016 | Coffman | |
| 9,702,563 B2 | 7/2017 | Probst et al. | |
| 9,839,320 B2 | 12/2017 | Robb | |
| 9,854,936 B2 | 1/2018 | Young | |
| 9,867,496 B2 | 1/2018 | Heuchling | |
| 9,943,188 B2 | 4/2018 | Fitzgerald | |
| 10,132,503 B2 | 11/2018 | Probst et al. | |
| 10,143,334 B2 | 12/2018 | Despain et al. | |
| 10,219,653 B1 * | 3/2019 | Ruiz | A47J 37/0763 |
| 10,376,099 B2 | 8/2019 | Green | |
| 10,426,291 B2 | 10/2019 | Fitzgerald | |
| 10,610,051 B2 | 4/2020 | Hussain et al. | |
| 10,712,010 B2 | 7/2020 | Despain | |
| 10,993,582 B2 | 5/2021 | Plunk | |
| 11,000,155 B2 | 5/2021 | Veatch, III et al. | |
| 2002/0166928 A1 | 11/2002 | Johnson | |
| 2004/0123857 A1 | 7/2004 | Viraldo | |
| 2007/0193576 A1 | 8/2007 | Hughes | |
| 2012/0318255 A1 | 12/2012 | Brown | |
| 2016/0153664 A1 | 6/2016 | Giuntoli et al. | |
| 2016/0166106 A1 | 6/2016 | Garcia et al. | |
| 2016/0183721 A1 | 6/2016 | Fakhuri | |
| 2017/0013999 A1 | 1/2017 | Horsfield | |
| 2017/0049265 A1 | 2/2017 | Heuchling | |
| 2018/0119960 A1 | 5/2018 | Fisher et al. | |
| 2019/0024902 A1 | 1/2019 | Johnson | |
| 2019/0053666 A1 | 2/2019 | Hofer | |
| 2021/0177203 A1 | 6/2021 | Ngo | |
| 2021/0219780 A1 | 7/2021 | Veatch, III et al. | |
| 2023/0018453 A1 * | 1/2023 | Crandon | A47J 37/0704 |

FOREIGN PATENT DOCUMENTS

| | | |
|---|---|---|
| EP | 3117748 A1 | 1/2017 |
| EP | 3446603 A1 | 2/2019 |
| FR | 439220 A | 6/1912 |
| FR | 846360 A | 9/1939 |
| FR | 1003317 A | 3/1952 |
| FR | 1426845 A | 1/1966 |
| KR | 101646218 B1 | 8/2016 |
| KR | 20170127657 A | 11/2017 |
| KR | 1020170127657 A | 11/2017 |
| KR | 102085170 B1 | 3/2020 |
| KR | 102239256 B1 | 4/2021 |
| WO | 2015087312 A2 | 6/2015 |

OTHER PUBLICATIONS

International Search Report, International Application No. PCT/US23/15756, Jul. 31, 2023, 4 Pages.

Written Opinion of the International Searching Authority, International Application No. PCT/US23/15756, Jul. 31, 2023, 8 Pages.

Buffalo Tools FCAGE Safeburn Fire Cage 42In×22In, Silver, Amazon.com product page, Accessed at https://www.amazon.com/Sportsman-FCAGE-Folding-Steel-Fire/dp/B07C7TXY3Y/, Accessed on Mar. 24, 2022, Date First Available: Apr. 12, 2018, 7 Pages.

BurnCage (Original), DrPower Product Page, Accessed at https://www.drpower.com/Power-Equipment/BurnCage/BurnCage-%28Original%29/p/000000000000314490, Accessed on Mar. 24, 2022, Date of Newest Review: Mar. 20, 2022, 4 Pages.

Wire Mesh for Fire Pit, Accessed at https://homemakerbarbi.com/28297-wire-mesh-for-fire-pit/, Accessed on Mar. 24, 2022, Dated Jan. 8, 2019, 8 Pages.

Abdulrahman Alnasri, Information Disclosure Statement by Abdulrahman Alnasri, Sep. 1, 2022.

Invitation to Pay Additional Fees and, Where Applicable, Protest Fee, International Application No. PCT/US 23/15756, Mailing Date: Jun. 2, 2023, 2 Pages.

* cited by examiner

HEATING APPARATUS

BACKGROUND

Various heating apparatuses have been used hold fuel and allow for cooking food and to provide heat for other purposes. Many of them are designed for outdoor use. Such apparatuses have included porous fire cages, grills, and food smokers, among others.

SUMMARY

Whatever the advantages of previous heating apparatuses, they have neither recognized the features of the heating apparatuses described and claimed herein, nor the advantages produced by such heating apparatuses.

According to one aspect, a heating apparatus can include a fire cage including multiple porous walls around a cage space. The fire cage can be designed to contain heated fuel in the cage space. The heating apparatus can also include a container configured to be supported by the fire cage at a container position, wherein the container is above at least a portion of the cage space. The container can be designed to hold burning fuel above the heated fuel.

According to another aspect, a heating apparatus can be arranged to form a food grill. The food grill can include a base, and the base can support a base sheet above a heat source, where the base sheet can be designed to support food being grilled and/or other items. The heating apparatus can also be rearranged to form a fire cage configuration. The fire cage configuration can include the base and a fire cage, with the fire cage being supported by the base.

According to yet another aspect, heated fuel in a fire cage of a heating apparatus in a first location can be produced. A thermal store can be placed in a heat collecting position on a side of the fire cage. The heated fuel inside the fire cage can heat the thermal store while the thermal store is in the heat collecting position. The thermal store can be moved away from the fire cage after the heated fuel inside the fire cage has heated the thermal store in the heat collecting position. The thermal store can be positioned in a second location away from the fire cage. While in the second location, the thermal store can emit thermal energy to heat air around the second location.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

The description and drawings may refer to the same or similar features in different drawings with the same reference numbers.

DETAILED DESCRIPTION

Figure 1:
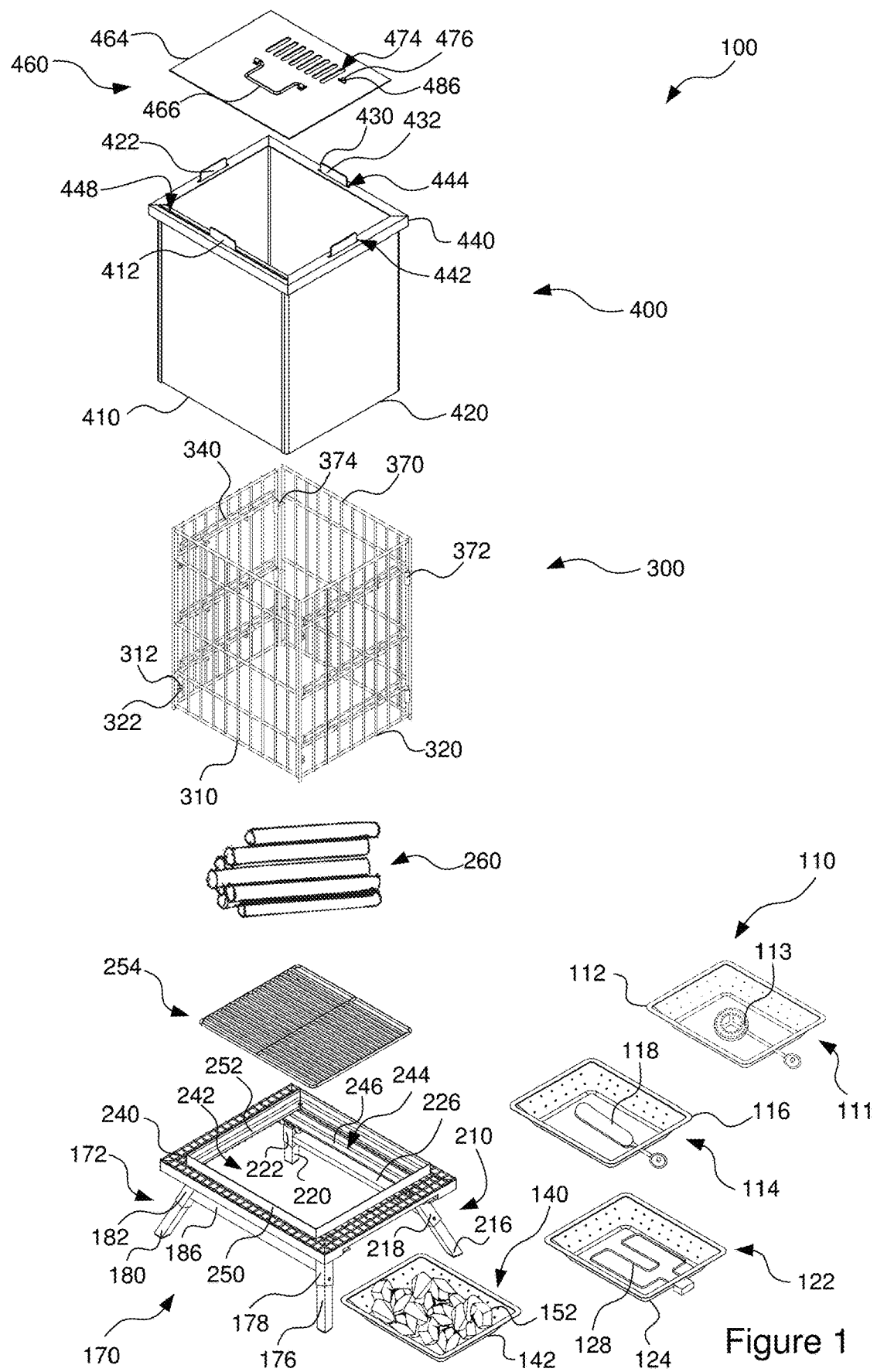
FIG. 1 is an exploded top-front-right perspective view of a heating apparatus.

Referring to FIG. 1, an example of a heating apparatus 100 is illustrated in an exploded view. Different components of the heating apparatus 100 can be combined in different ways to form different configurations, which may perform different functions in different ways. Also, the heating apparatus 100 can include additional components and/or fewer components than illustrated in FIG. 1, such as adding other containers illustrated in other figures discussed below. For example, as will be discussed, the heating apparatus 100 can be reconfigured to form a horizontal grill, a fire cage, a water heater, a space heater, a vertical grill, a smoker and/or an oven in different configurations. Other configurations may also be formed to perform other heating apparatus functions. As will be discussed different configurations may not include all the components of the heating apparatus 100.

A. Heating Apparatus Components

Referring still to FIG. 1, the heating apparatus 100 can include various heat sources 110. For example, a fluid heat source 111 can include an open container 116 that supports a fluid burner 113 such as a circular gas burner, which can be for burning natural gas, propane, or some other fluid fuel. As another example, a fluid heat source 114 can include an open container 116 that supports a fluid burner 118 such as an elongate gas burner, which can be for burning natural gas, propane, or some other fluid fuel. As another example, an electric heat source 122 can include an open container 124 that can support an electric heating element 128, which can be powered by alternating current and/or direct current electricity. As yet another example, a solid fuel heat source 140 can include an open container 142, which can support solid fuel such as charcoal, firewood, flammable pellets, etc. Each of the open containers 116, 124, and 142 may be a porous container, such as a container formed of a wire mesh or a solid container with holes formed in it, such as in the walls and/or floor of the container. Alternatively, one or more of the open containers may be formed of solid non-perforated material. Also, the containers may be different shapes, such as flat sheets, shallow trays, etc. Additionally, as will be discussed later, other heat sources may also be used, such as where firewood 260 or charcoal 152 is burning in other parts of the heating apparatus, as discussed more below.

The heat sources 110 and some other components of the heating apparatus 100 can be removably supported by a base 170. The base 170 can include a front leg structure 172. The front leg structure can include a right leg 176, which can telescope into and out of a right support tube 178, and a left leg 180, which can telescope into and out of a left support tube 182. Each leg 176 and 180 can be locked into place relative to the respective support tube 178 or 182, such as with a spring-loaded pin mounted on the leg 176 or 180 and extending into a hole in the corresponding support tube 178 or 182. The right support tube 178 can be fixed to the left support tube 182 by a support bar 186. The front leg structure can swing rearward and upward about a pivot 188 (see FIG. 5) to a closed position (not shown).

The base 170 can also include a rear leg structure 210. The rear leg structure 210 can include a right leg 216, which can telescope into and out of a right support tube 218, and a left leg 220, which can slide into and out of a left support tube 222 to shorten or lengthen the protruding portion of the leg. Each leg 216 and 220 can be locked into place relative to the respective support tube 218 or 222, such as with a spring-loaded pin mounted on the leg 216 or 220 and extending into a hole in the corresponding support tube 218 or 222. The right support tube 218 can be fixed to the left support tube 222 by a support bar 226. The rear leg structure 210 can swing rearward and upward about a pivot 228 (see FIG. 5) to a closed position (not shown).

Figure 5:
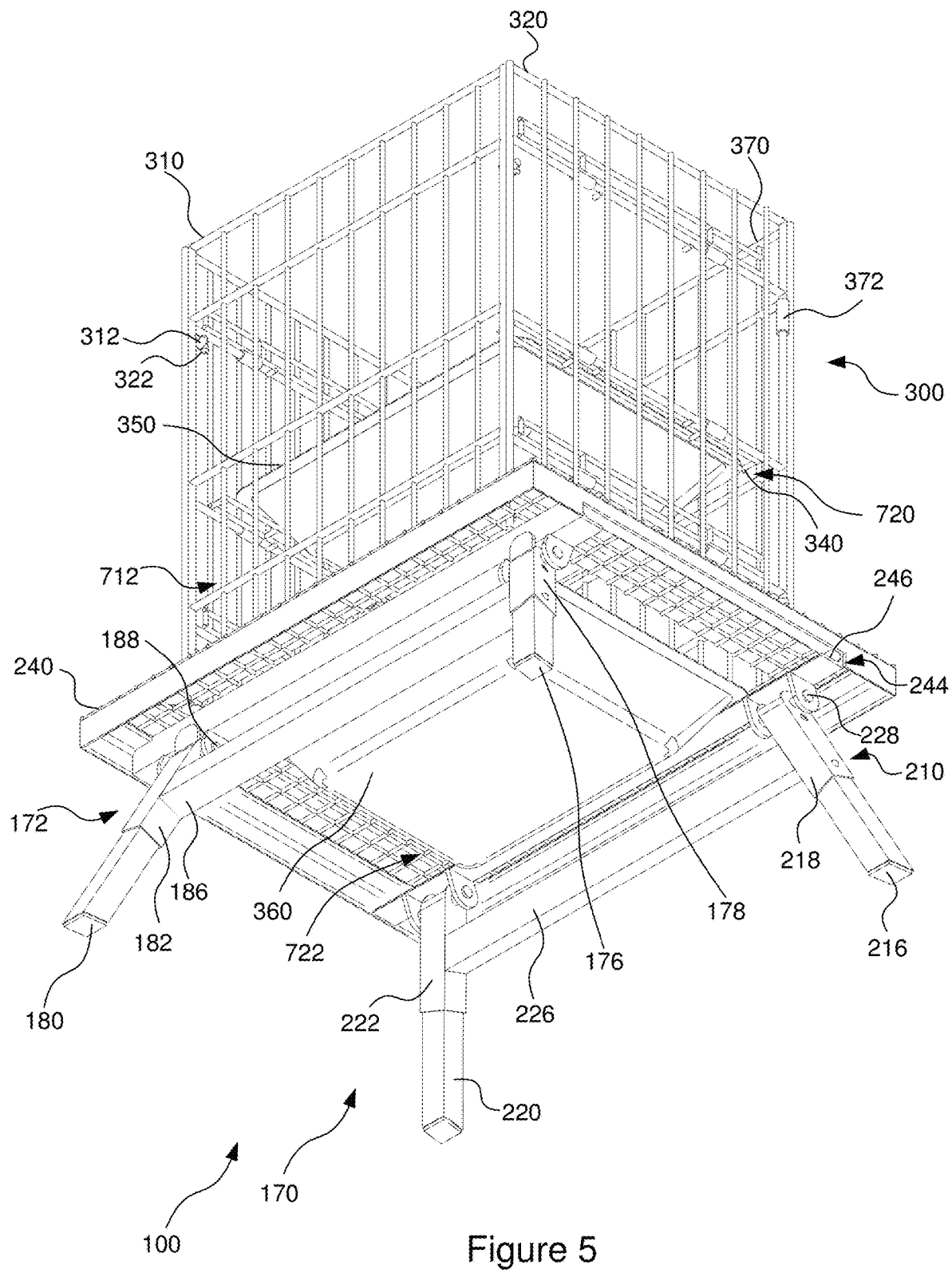
FIG. 5 is bottom-front-right perspective view of the heating apparatus configuration of FIG. 4.

The pivots 188 and 228 (such as hinges) of the front leg structure 172 and the rear leg structure 210 can be secured to respective front and rear portions of a platform 240 of the base 170 (such as via brackets fixed to the platform 240). The platform 240 can be a rectangular structure around the periphery of a rectangular hole 242, although it could be different shapes (e.g., circular, oval, triangular, etc.). The base 170 can further include a container support structure 244, which can include opposing front and rear rails 246, each of which can extend down and then in toward each other (see also FIG. 5). The rails 246 can be positioned to receive and support a container, such as the open containers 116, 124, and 142 of the heat sources 110 (see also FIG. 5 showing a container 360 supported by the rails 246). Thus, the different containers 116, 124, and 142 of the heat sources 110 can be interchanged by sliding them into and out of the rails 246 of the support structure 244 beneath the platform 240 of the base 170.

A rectangular rim 250 can extend up from the platform 240 around a shoulder 252, which can extend around the rectangular hole 242 of the platform 240. One of the containers 116, 124, or 124 can be placed downwardly into the rectangular hole 242 of the platform 240, so that the periphery of a container rests on the shoulder 252 to support the container instead of the container resting on and being supported by the rails 246 of the support structure 244.

The heating apparatus 100 can further include a base sheet 254. The base sheet 254 can be a rectangular grating. Alternatively, the base sheet 254 may take some other form, such as a flat perforated or non-perforated solid sheet, which may be surrounded by an upwardly extending rim. The base sheet 254 can be removably placed on the shoulder 252 of the platform 240 so that the base sheet 254 at least partially spans the rectangular hole 242 of the platform 240. Also, an open container, such as one of the open containers 116, 124, or 142 of the heat sources 110 can be placed with its opposite ends being supported by the shoulder 252 of the platform 240, with the open container 116, 124, or 142 at least partially spanning the rectangular hole 242 of the platform 240. Indeed, an open container may be resting on the shoulder 252 of the platform 240, with the base sheet 254 resting on the container. The base sheet 254 can be used to hold food being cooked, or to hold fuel that is positioned in the fire cage, which is discussed below.

Referring still to FIG. 1, the heating apparatus 100 can further include firewood 260. However, other types of solid fuel, such as charcoal 152, may be used in place of the firewood 260.

Referring still to FIG. 1, the heating apparatus 100 can further include a fire cage 300. The fire cage 300 can be a porous cage such as a wire cage as illustrated in the figures, or another type of porous cage, such as a cage formed of solid sheets with holes formed therein. In the example of the cage illustrated in the figures, the cage can be formed of a network of crossing rods, which can be secured together such as by welding or by being cast as a single piece for each side.

The fire cage 300 can include a front wall 310, which can include four downwardly extending hooks 312 (with upper and lower hooks 312 on the right side and with upper and lower hooks 312 on the left side of the front wall 310) to removably secure the front wall 310 to a pair of side walls 320. Each side wall 320 can include upwardly extending hooks 322, with two hooks at the front of each side wall 320. The hooks 322 of the side walls 320 can interlock with the downwardly extending hooks of the front wall 310 when the front wall is secured to the side walls 320. The front wall 310 can be removed from the side walls 320 by lifting the front wall 310 and pulling the front wall 310 forward relative to the side walls 320. The front wall 310 can be secured to the side walls 320 by moving the front wall rearward and down relative to the side walls 320.

Figure 4:
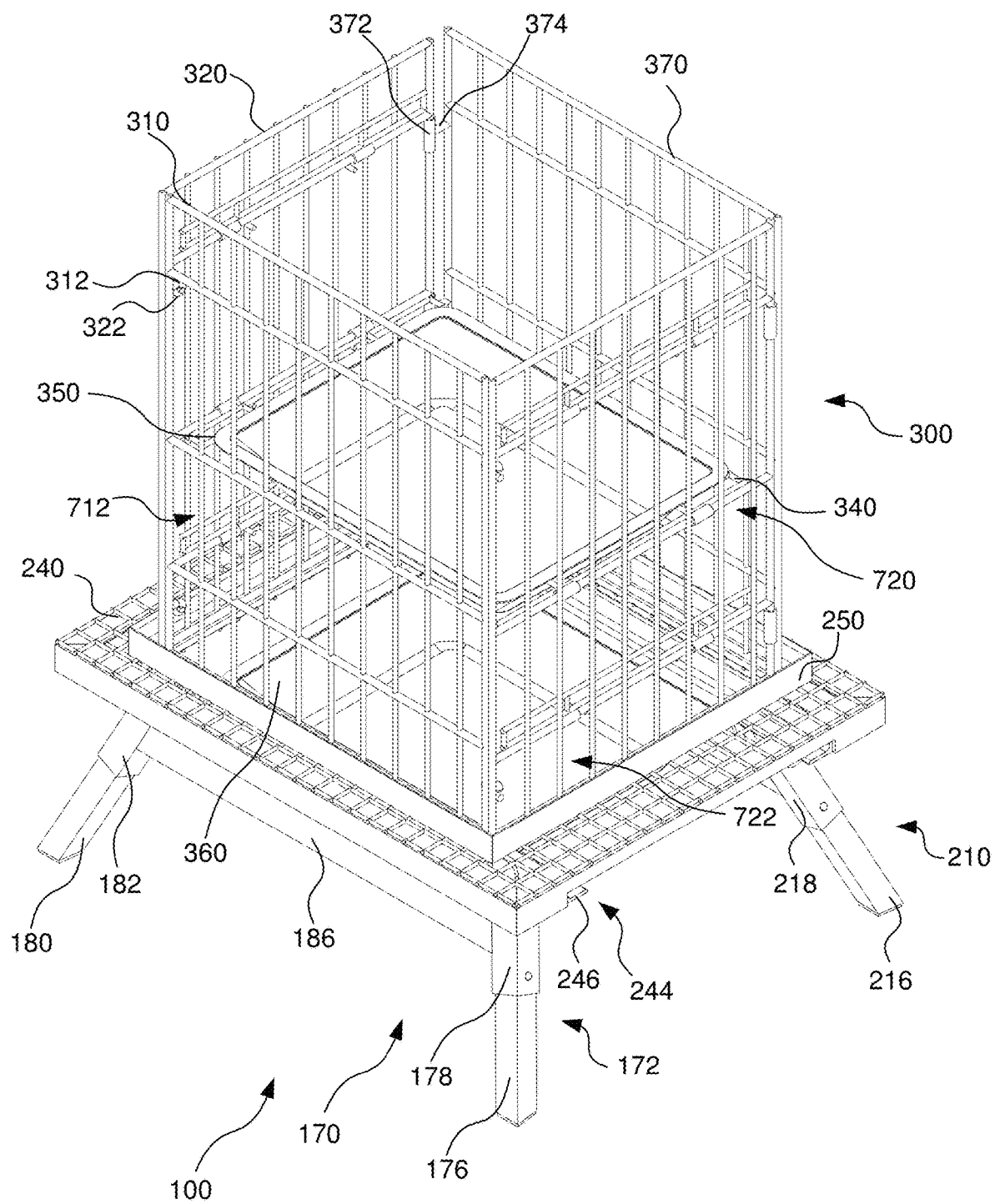
FIG. 4 is a top-front-right perspective view of another configuration of the heating apparatus of FIG. 1, with a container at a second container location.

Each side wall 320 can include a set of support arms 340, which may be retractable. For example, each support arm 340 may rotate about a pivot from a vertical retracted position along the corresponding side wall 320 to a horizontal extended position, wherein the support arm 340 extends inward from the side wall 320. In the extended position, each support arm 340 can rest on a fixed support, such as a rod extending from the side wall 320 inwardly toward the opposite side wall 320. Each support arm 340 can be substantially level with a corresponding support arm 340 on an opposite side wall 320, so that an article such as an open container can be supported by the pair of support arms 340, as is illustrated with an upper container 350 being supported by a pair of support arms 340 of the fire cage 300 of configuration of FIGS. 4-5, with a lower container 360 being supported by the container support structure 244. In the example of FIGS. 4-5, the middle support arms 340 of both side walls 320 are extended, while the upper and lower support arms of both side walls 320 are retracted.

Referring to FIG. 1, the fire cage 300 can further include a rear wall 370, which can be pivotally secured to the side walls 320 via pivots 372 (such as hinges). A spacer 374 may extend between the rear wall 370 and the pivots 372 on one side of the rear wall 370. With the front wall 310 removed from the side walls 320 of the fire cage 300, the side wall 320 opposite the spacer 374 can be folded into the rear wall 370. The side wall 320 adjacent to the spacer 374 can then be folded into the rear wall 370 to form a collapsed configuration (not shown) of the fire cage 300.

Figure 12:
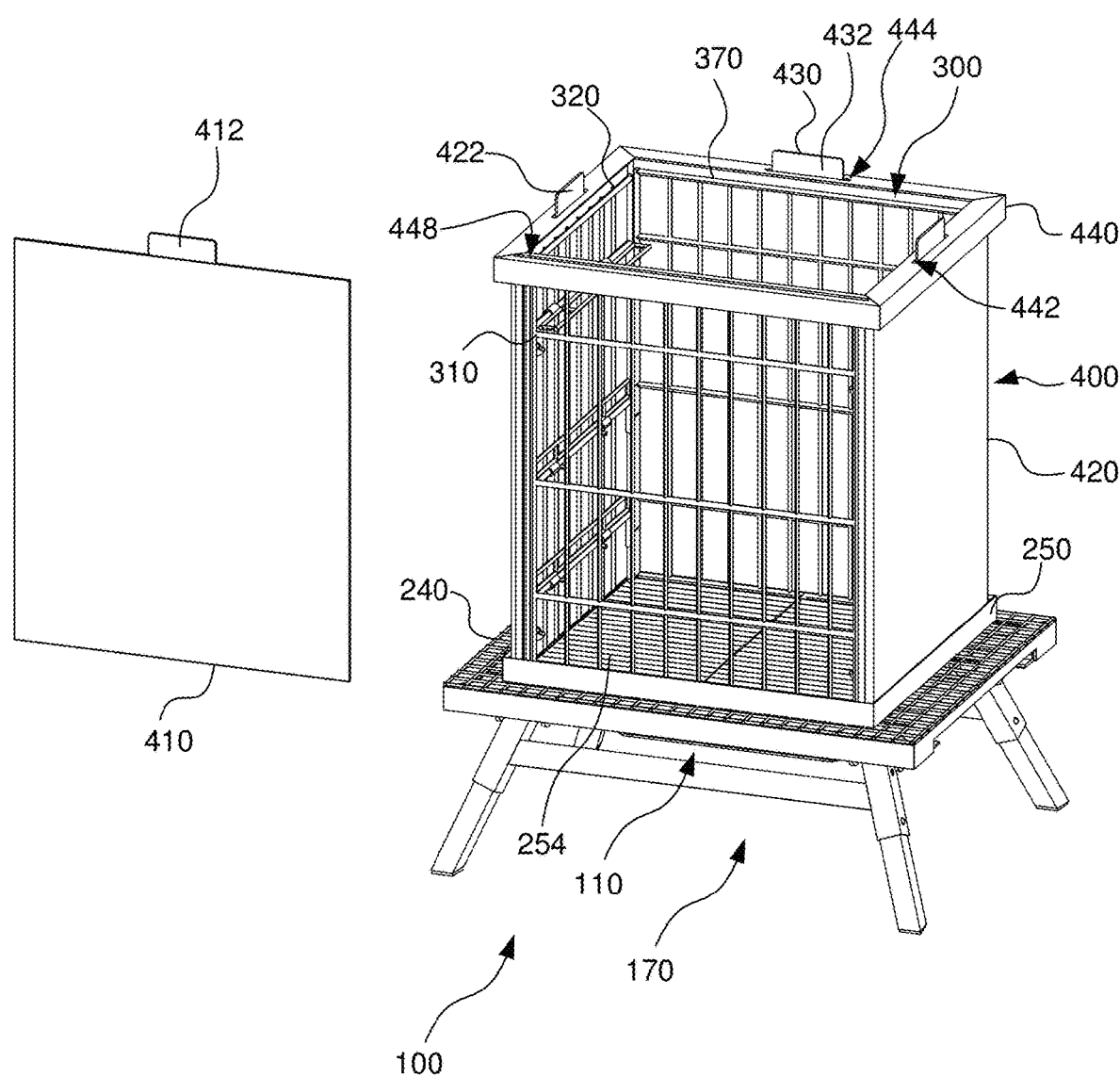
FIG. 12 is a top-front-right perspective view of a partially covered configuration of the heating apparatus of FIG. 1.
Figure 13:
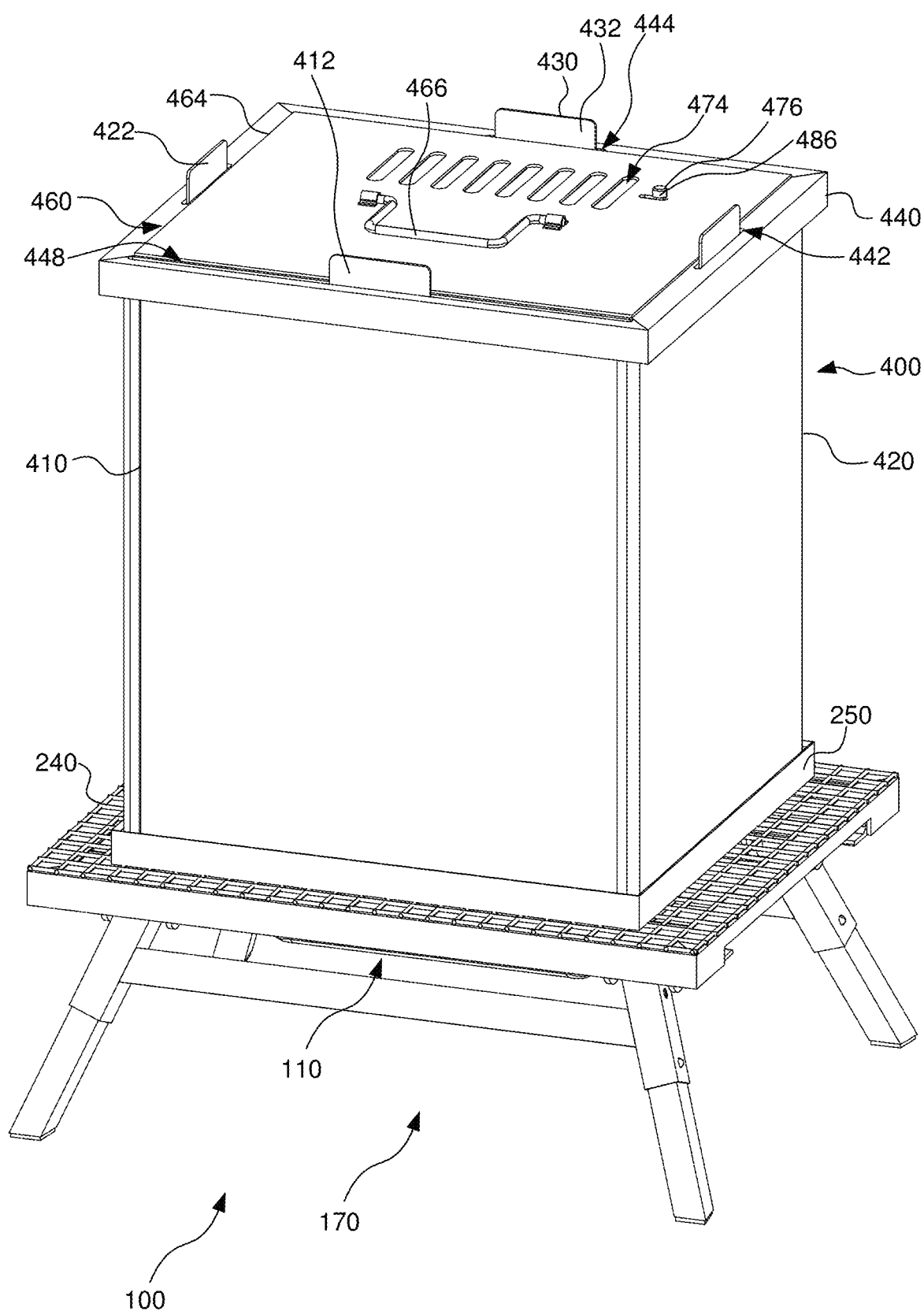
FIG. 13 is a top-front-right perspective view of a fully covered configuration of the heating apparatus of FIG. 1.

When in use, the front wall 310, side walls 320, and rear wall 370 of the fire cage 300 can be seated on the shoulder 252 of the platform 240 of the base 170, as illustrated in FIGS. 3-6, 9-10, 12, and 13 (though the fire cage 300 is hidden from view in FIG. 13).

Figure 14:
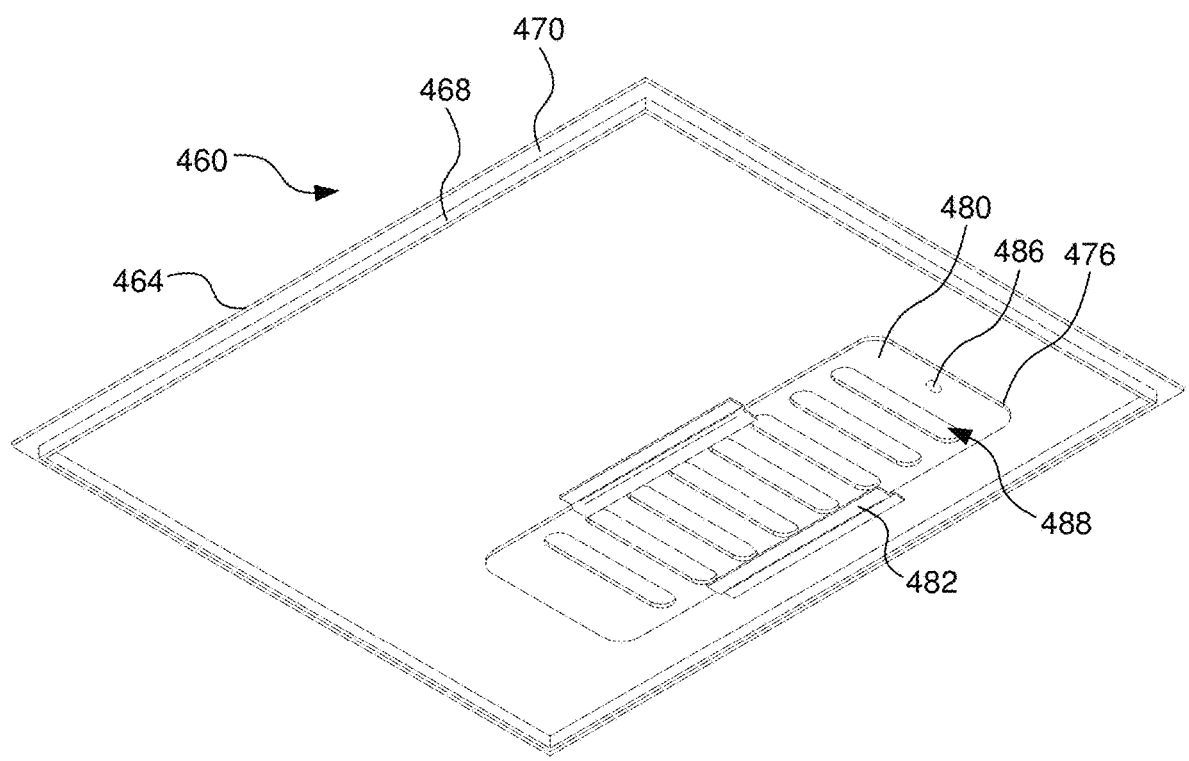
FIG. 14 is a bottom-front-right perspective view of a cover ceiling of the heating apparatus of FIG. 1.

Referring to FIG. 1 and also FIGS. 13-14, the fire cage can include a solid cover 400 that can be placed around and over the fire cage 300. The cover 400 can include a front wall 410, which can be a rectangular sheet with a tab 412 extending up from the top of the sheet. The cover 400 can also include side walls 420, which can each be a rectangular sheet with a tab 422 extending up from the top of the sheet. Also, cover 400 can include a rear wall 430, which can also include a rectangular sheet with a tab 432 extending up from the top of the sheet. The cover 400 can also include a removable rim 440, which can be supported on the tops of the side walls 420 and the rear wall 430 of the cover 400. The rim 440 can define vertically extending side holes 442 through which the tabs 422 of the side walls 420 extend and a vertically extending rear hole 444 through which the tab 432 of the rear wall 430 extends. The rim 440 can also include a vertically extending front hole 448 through which the tab 412 of the front wall 410 can extend. In addition, the front hole 448 can be large enough so that the entire width of the front wall 410 can slide through the front hole 448. When in use, the lower edges of the front wall 410, the side walls 420, and the rear wall 430 can rest on the shoulder 252 of the platform 240 of the base 170. The walls of the cover 400 can be positioned on the outside of corresponding walls of the fire cage 300. The cover 400 can also include a lid or ceiling 460.

Referring still to FIG. 1 and also to FIGS. 13-14, the ceiling 460 can include a generally solid sheet 464 to which a handle 466 can be secured at the top of the solid sheet 464. Additionally, a positioning ridge 468 can extend downward from a bottom of the solid sheet 464, leaving an outer shoulder 470 between the positioning ridge 468 and an outer edge of the solid sheet 464.

Additionally, vent holes 474 can be defined in the solid sheet 464 of the ceiling 460. Also, a vent adjuster 476 can be slid to cover varying amounts of the vent holes 474 to allow more or less air to flow through the vent holes 474. For example, the vent adjuster 476 can include a generally rectangular sheet 480 positioned along an underside of the solid sheet 464 of the ceiling 460 (see FIG. 14). The vent adjuster 476 can be held in place between the underside of the solid sheet 464 and brackets 482 that are secured to the underside of the solid sheet 464 and extend down and inward along an underside of the sheet 480 of the vent adjuster 476 (see FIG. 14). Also, a handle 486 of the adjuster 476 can be secured to the sheet 480 of the adjuster 476 (such as by the handle 486 being screwed into the sheet 480) and can extend up through a slot in the solid sheet of the ceiling 460. The sheet 480 of the adjuster 476 can define holes 488 therein that can align with the vent holes 474 in an open position. The holes 488 of the sheet 480 of the adjuster 476 can be misaligned with the vent holes 474 in a closed position, so that the sheet 480 of the adjuster 476 covers the vent holes 474. The handle 486 of the adjuster 476 can be manually moved continuously between the closed position and the open position to adjust the percentage of the area of the vent holes 474 that are open, and accordingly the amount of air flowing through the vent holes 474.

Referring back to FIG. 1, and to FIGS. 12-13, in use, the ceiling 460 can be supported by the rim 440, thereby covering the top of the fire cage 300. Accordingly, the cover 400 can cover the front, sides, rear, and top of the fire cage 300.

Figure 6:
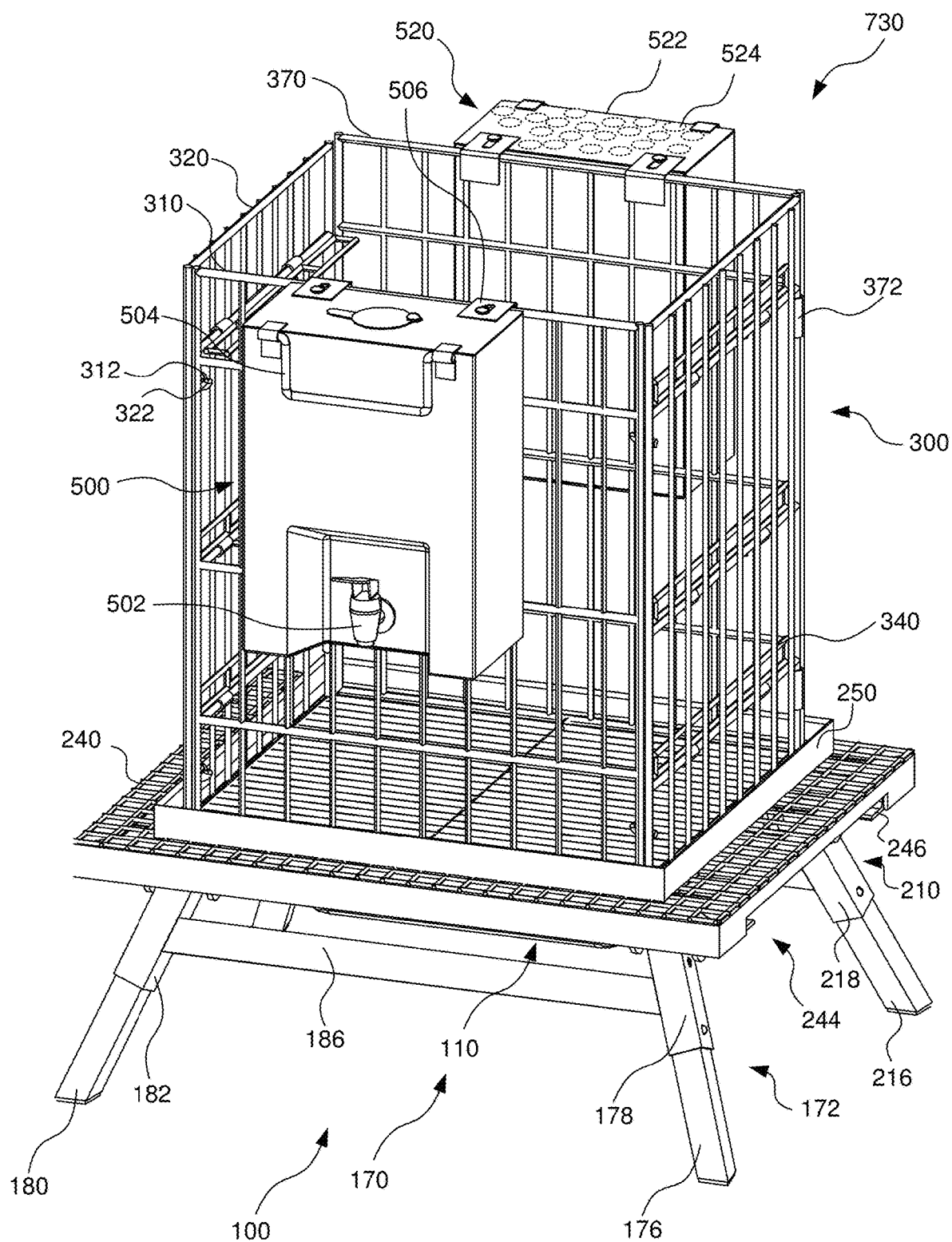
FIG. 6 is a top-front-right perspective view of a container heating configuration of the heating apparatus of FIG. 1, including additional containers not illustrated in FIG. 1.

Referring to FIGS. 6-11, the heating apparatus 100 can also include components that can be removably supported on the front wall 310, side walls 320, and/or rear wall 370 of the fire cage 300, so that such components can be heated by heated fuel in the fire cage 300. Referring to FIG. 6, a drink container 500 can be a container that includes a spigot 502 near a front bottom of the drink container 500, a handle 504 at the top of the drink container 500, and support hooks 506 extending rearward and down from a top rear of the drink container 500. The support hooks 506 can be hooked over a top edge of a wall of the fire cage 300, so that the drink container 500 can be supported by the fire cage 300 and can rest against an outside wall of the fire cage 300, as illustrated in FIG. 6. The drink container can contain drinks (i.e., liquids that are suitable for human consumption).

Referring still to FIG. 6, the heating apparatus 100 can also include a thermal store 520. The thermal store 520 can include a container 522, which can be filled with thermal storage elements 524 (illustrated by dashed lines in FIG. 6 because they can be inside the container 522), which can be storage elements that are suitable for storing thermal energy. For example, the thermal storage elements may be sand and/or gravel. The thermal store 520 can also include hooks that can extend rearward and down from a top rear of the thermal store 520. The container 522 of the thermal store 520 may be made of various materials, such as materials that are effective at radiating heat, such as copper-containing materials (such as pure copper or copper alloys). As illustrated in FIG. 6, one or more components can be mounted on the outside of the fire cage 300 at the same time.

Figure 7:
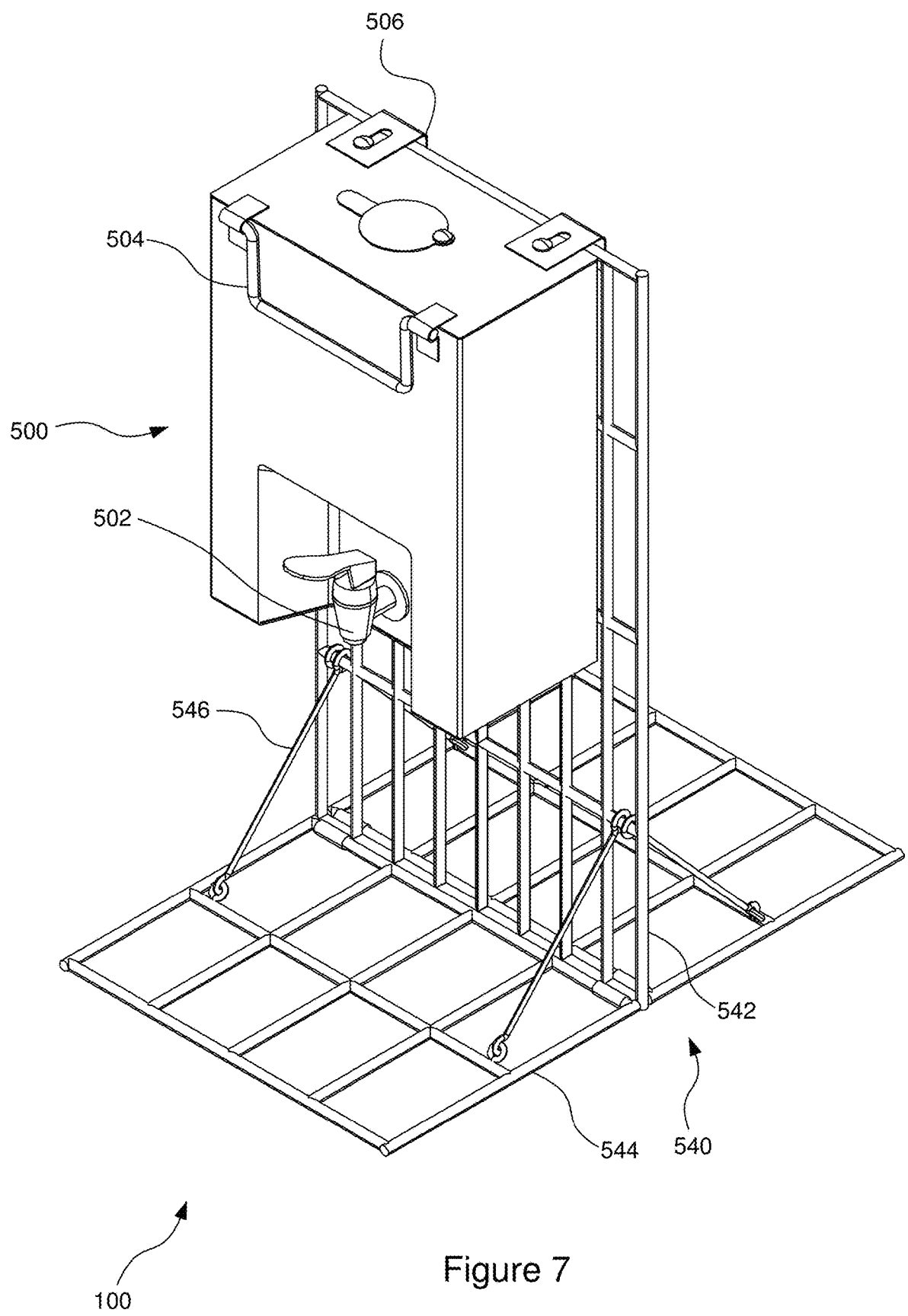
FIG. 7 is a top-front-right perspective view of a drink container and a stand of the heating apparatus.

Referring now to FIG. 7, the heating apparatus 100 can include a stand 540. The stand 540 can include a vertical wall 542 and one or more feet 544 extending out from the vertical wall 542. Braces 546 such as angled rods can extend between the vertical wall 542 and the feet 544 to hold the feet in position relative to the vertical wall 542. The braces 546 may be disengaged from the vertical wall 542 and/or from the feet 544 (for example, hooks on ends of the braces 546 may be unhooked from the vertical wall 542 and/or the feet 544) to allow the feet 544 to pivot toward the vertical wall to form a collapsed configuration of the stand 540 (the collapsed configuration is not shown). One or more of the components that can be mounted on the side of the fire cage 300 can be mounted on the stand 540 (see FIGS. 7 and 8). For example, such components may include the drink container 500, the thermal store 520, or a vertical grill 600. Indeed, one such component may be mounted on one side of the vertical wall 542 and another may be mounted on the other side of the vertical wall 542. Thus, the stand 540 can support items such as containers while they are being stored or used at other locations away from the fire cage 300.

Figure 9:
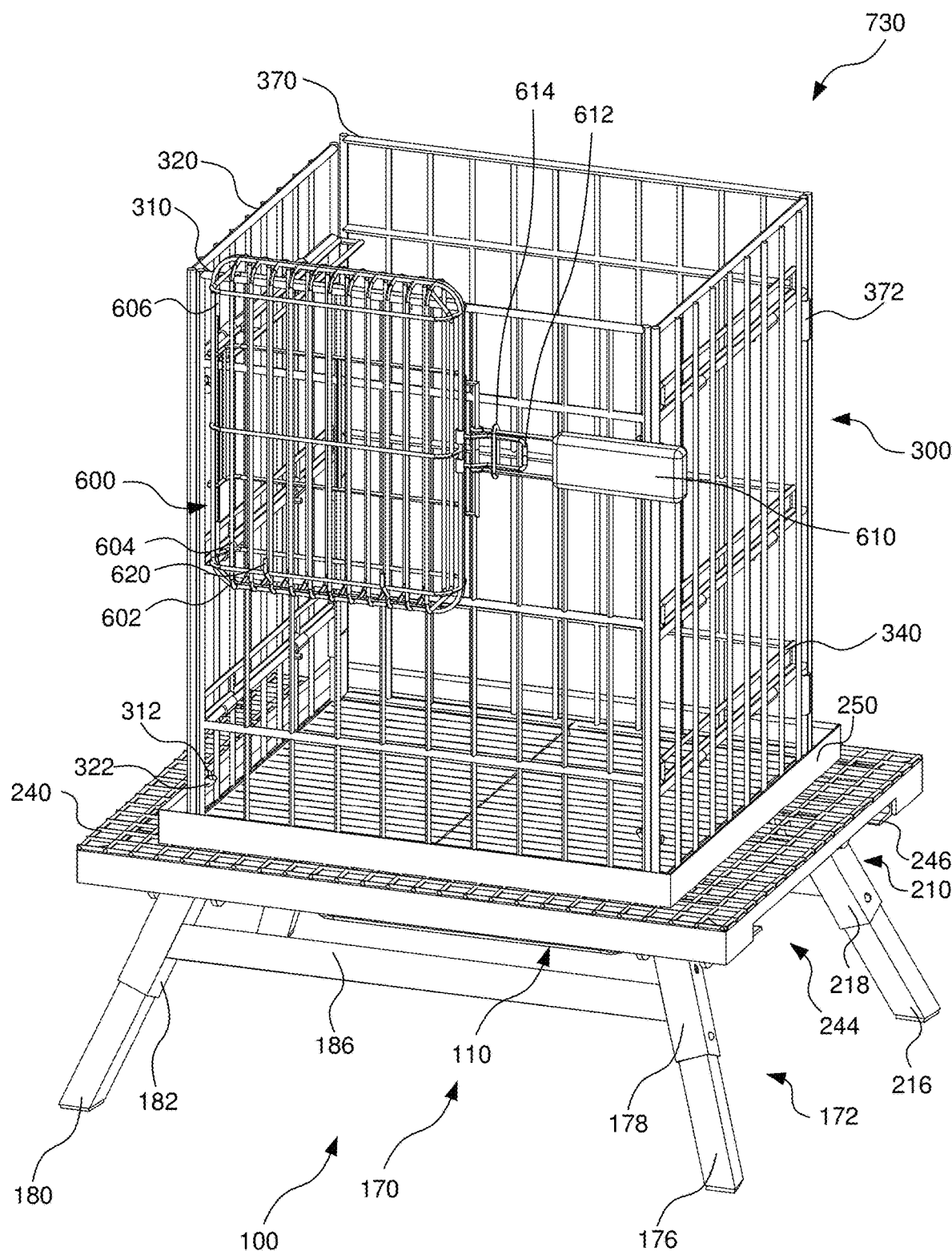
FIG. 9 is a top-front-right perspective view of a vertical grill configuration of the heating apparatus of FIG. 1, including an additional vertical grill not illustrated in FIG. 1.
Figure 10:
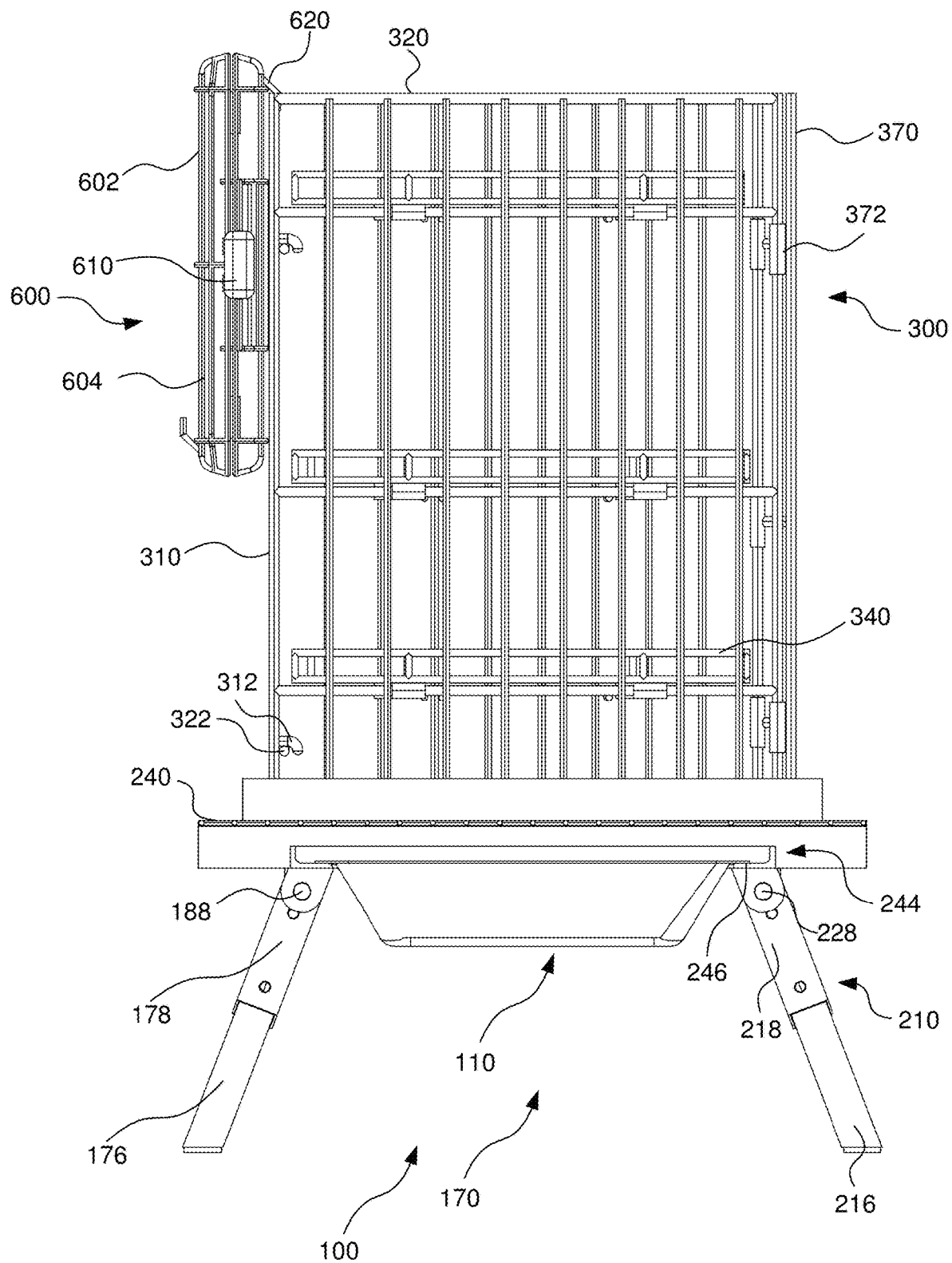
FIG. 10 is a right-side view of the vertical grill configuration of the heating apparatus of FIG. 1.
Figure 11:
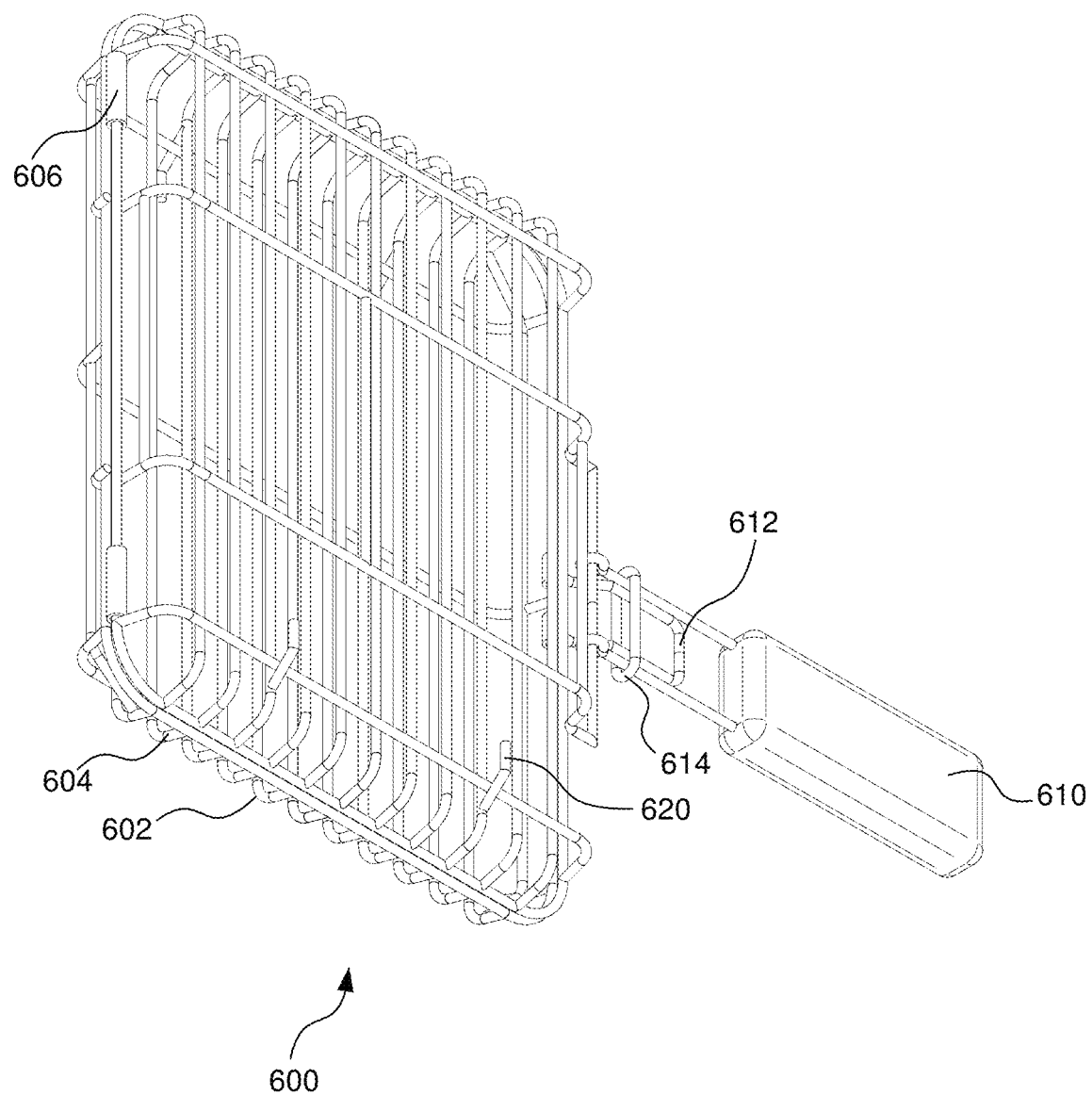
FIG. 11 is a bottom-front-left perspective view of the vertical grill from the vertical grill configuration illustrated in FIGS. 9-10.

Referring now to FIGS. 9-11, another component that can be mounted on a side of the fire cage 300 will be discussed. Specifically, the component can be a vertical grill 600. The vertical grill 600 can include a grilling cage 602, which can include two shells 604 that are connected by a hinge 606 on one side. On a side opposite the hinge 606, a handle 610 can be secured to one of the shells 604 and can extend away from the shells 604, and a handle catch 612 can be secured to the other of the shells 604 and can extend away from the shells 604 along the handle 610. A loop 614 can extend around a neck of the handle 610. The loop 614 can slide away from the shells to release the handle catch 612 and allow the shells 604 to pivot open. To secure the shells 604 to each other again, the shells 604 can be pivoted together, the catch can be pivoted against the neck of the handle 610, and the loop 614 can be slid toward the shells 604 and over the catch 612, to secure the catch 612 to the handle 610, and thereby secure the shells 604 to each other. Also, a pair of hooks 620 can be secured to each of the shells 604. With the vertical grill 600 mounted on the fire cage 300, a pair of hooks 620 can extend out over a top edge of a wall of the fire cage 300, as illustrated in FIGS. 9-10.

As illustrated in the figures, the shells 604 of the vertical grill 600 can be porous, such as where the shells form a wire cage within which food can be placed for grilling on the side of the fire cage 300. Alternatively, one or more of the shells 604 may be solid, which could be advantageous for cooking different types of food.

The heating apparatus can be made of materials that are durable and heat resistant. For example, at least part of the heating apparatus 100 can be made of stainless-steel components and/or aluminum alloy components, for example. Alternatively, other types of materials may be used. Also, the enlarged portion of the handle 610 of the vertical grill 600 may be made of a different type of material, such as a heat-resistant polymer material. Additionally, as discussed above, the container 522 of the thermal store 520 may be made of a copper-containing material, or another material that is effective at radiating heat. And the thermal storage elements 524 of the thermal store 520 may be made of effective heat storage elements, such as sand and/or gravel.

The components of the heating apparatus 100 can be made using standard manufacturing techniques, such as hot/cold rolling to form metal sheets and/or rods, milling or other types of cutting to form holes and/or shapes of sheets, bending techniques, welding to secure parts to each other, such as bars, brackets, and rods/wires of different parts. Techniques can also include molding, including over molding, such as in forming the large part of the handle 610 of the vertical grill 600 illustrated in the figures. And of course, other manufacturing techniques may also be used instead of or in combination with these techniques.

B. Use of the Heating Apparatus

Some examples of various configurations of the heating apparatus 100 and various uses of the heating apparatus 100 will now be discussed.

Figure 2:
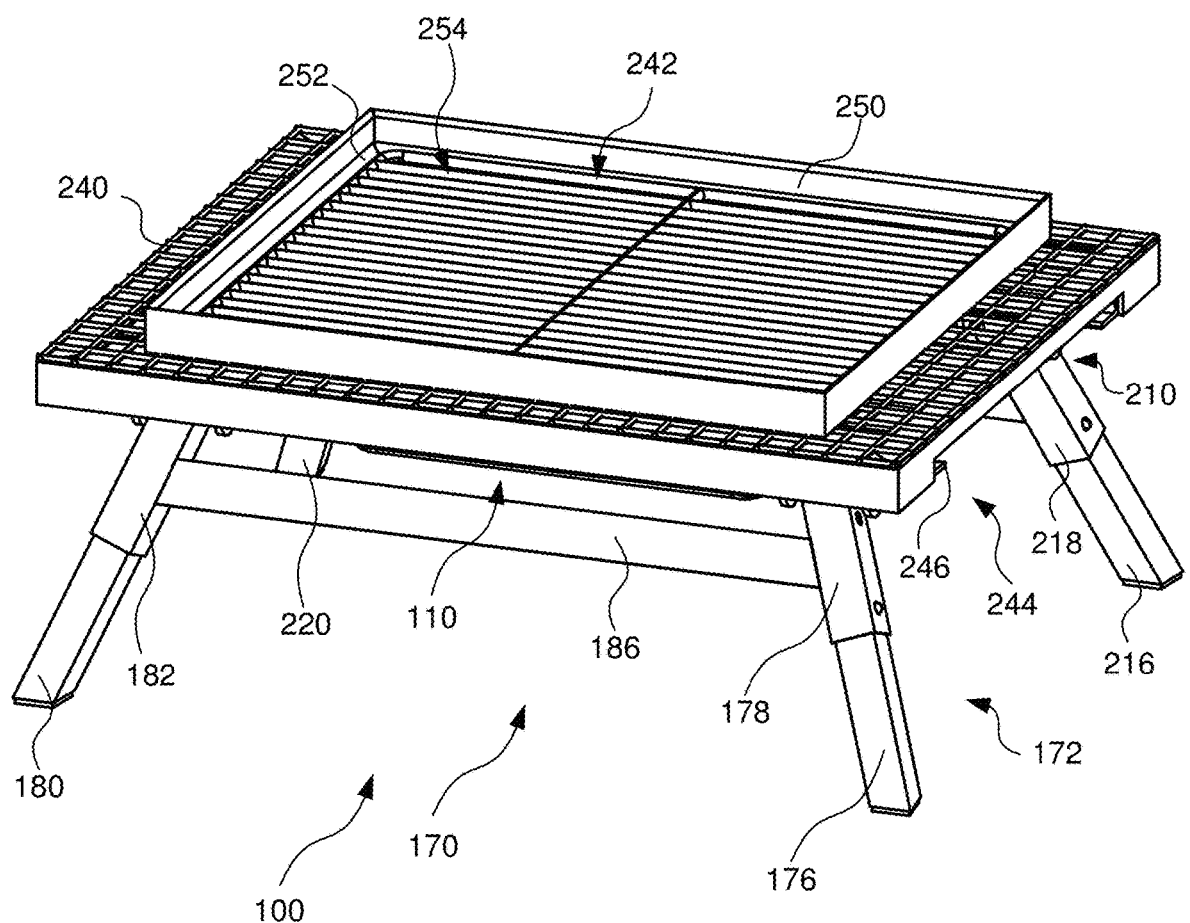
FIG. 2 is a top-front-right perspective view of the heating apparatus of FIG. 1 configured as a grill.

Referring to FIG. 2, a horizontal grill configuration of the heating apparatus 100 is illustrated. In the horizontal grill configuration, A heat source 110 can be supported by the base 170. Alternatively, a heat source could be unsupported by the base 170, such as where the base can be placed over a campfire that is on the ground. Either way, heat from the heat source can extend up through the rectangular hole 242 in the platform 240 of the base 170 to heat the base sheet 254, which can be seated on the base 170, and to heat food that is supported on the base sheet 254 while the food is being cooked. For example, the heat source may be the heat source 111, the heat source 114, the heat source 122, the heat source 140, or some other heat source. While the configuration of FIG. 2 is referred to as a grill configuration, it may be used as a stove to heat food in pots and/or pans resting on the base sheet 254, such as with the heat source 111 providing the heat.

Figure 3:
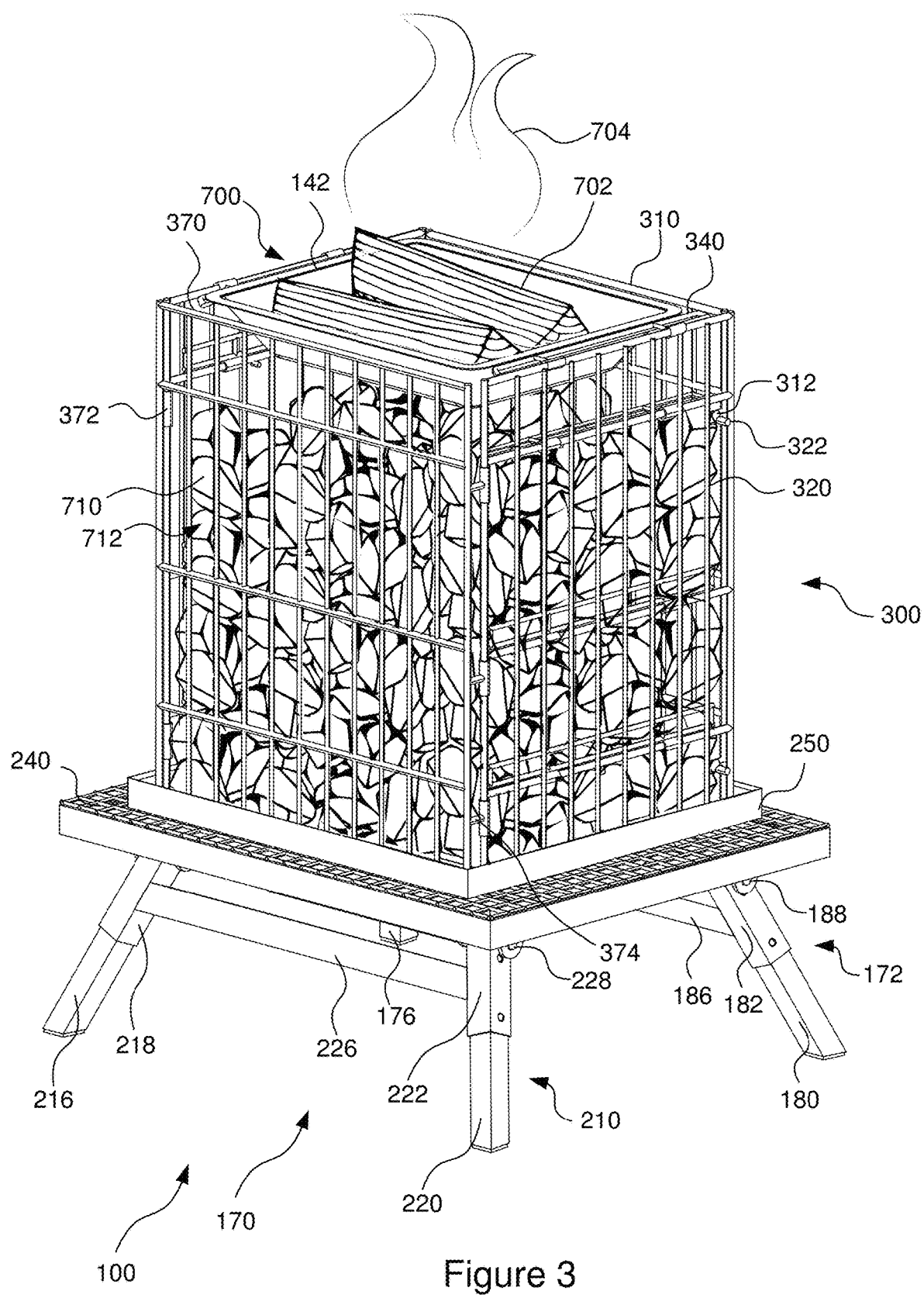
FIG. 3 is a top-rear-left perspective view of a fire-above-heated fuel configuration of the heating apparatus of FIG. 1, with additional support arms illustrated at a top of the fire cage.

Referring to FIG. 3, a fire-above-heated fuel configuration and its use is illustrated. In this configuration, the base sheet 254 may remain seated on the base 170, or a container may be supported by the base 170 to support fuel that is in the fire cage 300, with the fire cage being supported by the base 170. Additionally, a container such as the container 142 for a solid fuel heat source can be supported at a first container position 700 at the top of the fire cage 300, with the container 142 being supported by the fire cage 300. In the first container position 700, the container 142 can have its rim positioned at or above the top of the fire cage 300. Also, the container 142 can hold burning fuel 702 therein (such as burning firewood), which can burn so that the resulting flames 704 can extend above the sides of the container 142 and above the fire cage 300 so that at least a portion of the flames are visible above the fire cage 300.

While the burning fuel is burning, heated fuel 710 such as hot coals can be housed in the fire cage 300, and specifically in a cage space 712 defined by the fire cage 300 below the container 142 holding the burning fuel 702. The heated fuel 710 in the fire cage 300 can produce heat, such as for cooking or heating other items, such as in the containers on the side of the fire cage 300 illustrated in FIGS. 6-11, or for roasting food on a handheld roasting device (e.g., roasting marshmallows or meat that is held on a roasting stick to the side of the fire cage 300). Thus, in this configuration, the benefits of the heated fuel 710 for heating items can be combined with the aesthetic properties and other uses of the flames 704 of the burning fuel 702.

In some configurations, the container 142 supporting the burning fuel 702 may be below the top of the fire cage 300 and still produce advantageous results, especially if heated fuel 710 is located in a cage space beneath the container 142 supporting the burning fuel 702. In some situations, this may still allow flames 704 to rise above the top of the fire cage 300, such as if the container were located in the next set of support arms 340 down from what is illustrated in FIG. 3 (i.e., with the container 142 resting on the support arms 340 between the first container location 700 of FIG. 3 and the second container location 720 of FIGS. 4-5). As another example, the container 142 supporting the burning fuel 702 may be located in a second container location 720 of a container 350 illustrated in FIGS. 4-5. Also, while the container 142 illustrated in FIG. 3 is illustrated as a non-perforated container, a perforated container may be used, such as where the sides and/or floor of the container are perforated to allow for additional airflow to the burning fuel 702 (as illustrated in the container 142 in FIG. 1).

Referring to FIGS. 4-5, another configuration is shown with a container 350 at the second container location 720. Additionally, another container 360 is located at a third container location 722 seated in the base 170. The container at the second container location 720 is supported by support arms 340 of the side walls 320 of the fire cage 300. For example, in this configuration, a heat source 110 seated in the base 170 (such as the container 360 holding fuel) can provide heat to cook food items held in the container 350 at the second container location 720. Combinations of different containers supported on different support arms 340 and/or on the top edges of the fire cage can hold items to be heated, such as food to be cooked.

Referring now to FIG. 6, container heating configuration is illustrated with the fire cage 300 supporting the drink container 500 on the front wall 310 and the thermal store 520 on the rear wall 370 of the fire cage 300. This configuration can be used with burning and/or heated fuel held in the fire cage 300 to heat the drink container 500 and its contents, and to heat the thermal store 520.

Referring to FIG. 7, the containers may be moved from being supported on the side of the fire cage to being supported on the stand 540. For example, drinks such as water may be heated with the drink container 500 supported on the fire cage 300, and the drink container 500 can then be moved to a different location away from the fire cage 300 so that users can open the spigot 502 to get heated drinks from the drink container 500 without the drink container 500 needing to be at the same location as the fire cage 300.

Figure 8:
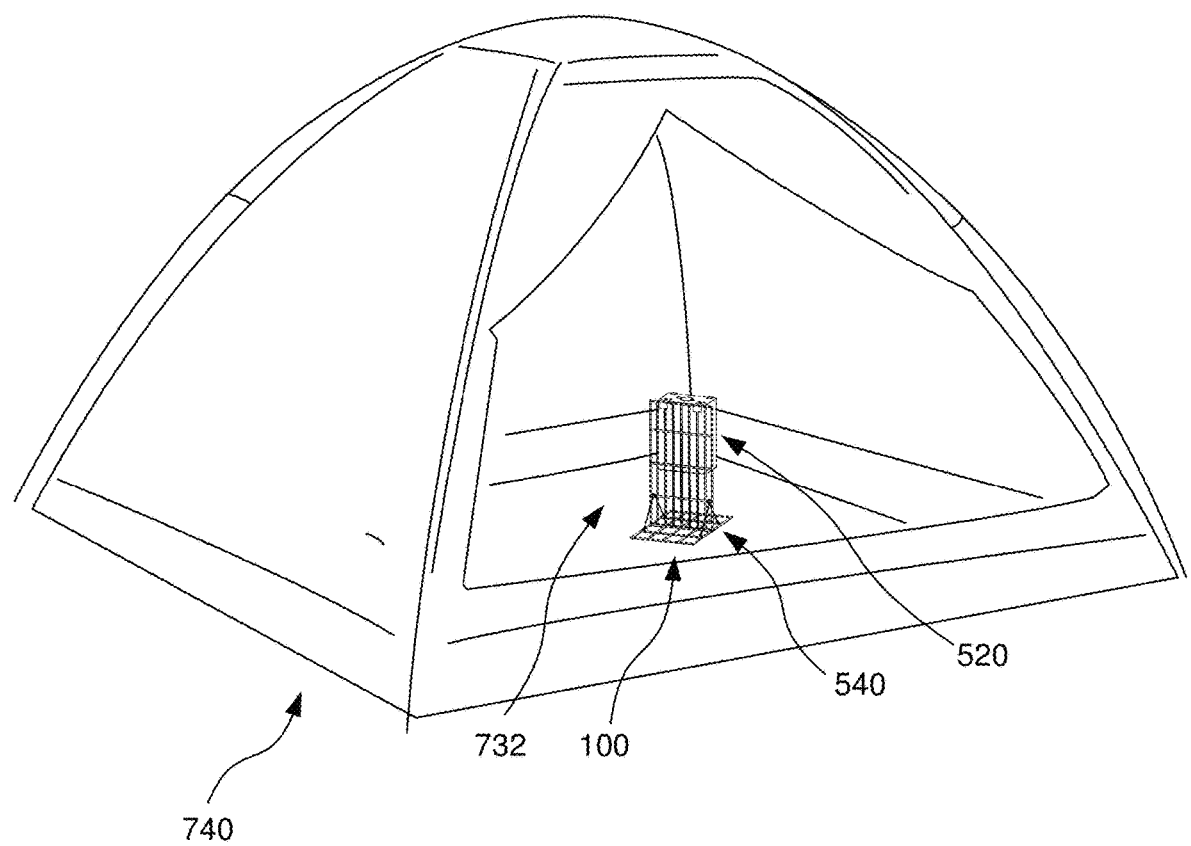
FIG. 8 is a top-rear-left perspective view of the stand and a thermal store of the heating apparatus positioned in a tent.

Similarly, other components heated while supported on the sides of the fire cage 300 can be moved to a different location away from the fire cage and supported on the stand 540. Referring to FIG. 8, as an example, the thermal store 520 can be moved away from the fire cage 300 to a different location 732 on the stand 540 in a tent 740, after the thermal store 520 has been heated by a heat source in the fire cage 300. Thus, the thermal store 520 can collect heat from the heat source in the fire cage 300 at a first location 730 (such as an outdoor location, such as in a park, a yard of a home, or a campsite) and can emit heat to heat the air in a second location 732 (such as in another outdoor location, such as in the tent 740).

Referring now to FIG. 9, a vertical grill configuration is illustrated. The vertical grill configuration can be like the container heating configuration of FIG. 6, except with the vertical grill 600 mounted on a wall of the fire cage 300. Indeed, the vertical grill 600 can be mounted on a wall of the fire cage 300 at the same time that the thermal store 520 and/or the drink container 500 are also mounted on the fire cage 300. Specifically, the shells 604 of the vertical grill 600 can be opened, food can be placed in the shells 604, the shells 604 can be closed, and the shells 604 can be secured in the closed position using the catch 612 and the loop 614, as discussed above. The vertical grill 600 can then be grasped by the handle 610 and placed with a pair of hooks 620 being hooked over a top edge of a wall of the fire cage 300. The food in the vertical grill 600 and the vertical grill 600 itself can then be heated by heated and/or burning fuel in the fire cage 300. When the food is done, the vertical grill 600 can be lifted up and away from the fire cage 300 and moved to a different location using its handle 610. The shells 604 can then be opened and the food removed from the vertical grill 600. Of course, when handling the vertical grill 600 while it is hot, and when handling any of the components of the heating apparatus 100 while they are hot, care should be taken to avoid having the user be burned by the components. For example, hot pads, heat-resistant gloves, or other tools may be used to handle such components while they are hot. Other standard safety precautions for fire and/or heated items should also be used.

Referring now to FIGS. 12-13, use of the cover 400 will be discussed. To place the cover 400 on the fire cage 300, the side walls 420 and the rear wall 430 can be placed against the corresponding walls of the fire cage 300, with the lower edges of the side walls 420 and the rear wall 430 of the cover 400 being supported by the shoulder 252 of the platform 240 of the base 170. The rim 440 of the cover 400 can be move downwardly onto the side walls 420 and the rear wall 430, so that the rim 440 is resting on the top edges of the solid sheets of the side walls 420 and the rear wall 430, with the side wall tabs 422 and the rear wall tab 432 extending up through the corresponding side holes 442 and rear hole 444 of the rim 440, as illustrated in FIG. 12. Alternatively, the rim 440 can first be placed so that it is resting on the top edges of the walls of the fire cage 300. In sequence, the tabs 422 and 432 of each of the side walls 420 and the rear wall 430 can then be inserted upwardly through the corresponding holes 442 and 444 of the rim, followed by the lower edge of the side wall 420 or rear wall 430 being moved over the rim 250 of the base 170 and onto the shoulder 252 of the base 170. Other techniques for positioning the side walls 420, the rear wall 430, and the rim 440 of the cover as illustrated in FIG. 12 may also be used.

The front wall 410 of the cover 400 can be slid downwardly through the front hole 448 of the rim 440 until the bottom edge of the front wall 410 rests on the shoulder 252 of the base 170. Also, the ceiling 460 can be moved downwardly until its periphery is resting on top of the rim 440. FIG. 13 illustrates the heating apparatus 100 with components of the cover in position for use to cover the fire cage 300.

All or part of the cover 400 may be placed on the fire cage 300 for any of various reasons. For example, all the components of the cover 400 can be placed on the fire cage 300 to prevent hot coals and fire from escaping the fire cage 300 when it is not in use. As another example, all or a subset of the components of the cover 400 may be positioned to shield the space defined by the fire cage 300 from wind. For example, one or more of the side walls 420 and/or the rear wall 430 may be positioned on the heating apparatus 100 while starting a fire in the fire cage 300. This may be as illustrated in FIG. 12, but possibly with the front wall 310 of the fire cage 300 being removed to provide easy access to the space inside the fire cage 300. This configuration with the front wall 310 of the fire cage 300 and the front wall 410 of the cover 400 removed may also be used to provide access, such as to place items inside the fire cage 300 or remove items from the inside of the fire cage 300. For example, such items can include fuel inside the fire cage and/or containers that are resting on the support arms 340 of the fire cage 300, like the container in the fire cage 300 as illustrated in FIGS. 4-5, for example.

As another example, the cover 400 may be placed on the fire cage 300 so that the heating apparatus 100 can be used as a smoker to smoke food. This may be done with a heat source 110 positioned in the base 170 to provide heat (if charcoal is used as the heat source, then smoke-producing fuel (e.g., wood or smoke-producing pellets) may also be placed on the charcoal, for example), and with containers seated in the fire cage 300 to hold water (in a container just above the heat source, for example) and to hold food being smoked. While smoking food, the amount of air flowing may be adjusted using the vent adjuster 476 to adjust air flowing through the vent holes 474 of the ceiling 460 of the cover 400. Such adjustments can be used to adjust temperatures inside the fire cage 300. The cover 400 and/or the heat source container may also include additional adjustable vents like the adjustable vents in the ceiling 460 of the cover 400 to provide additional adjustments when smoking or doing other cooking with the cover 400 in place. A similar configuration may be used for the heating apparatus 100 to act as an oven, but without using some fuel specifically to produce smoke for smoking food.

C. Example Tools and Techniques

Some examples of heating apparatus tools and techniques are discussed below. Features discussed in each of the tools and techniques below and those described above may be combined with each other in any combination not precluded by the discussion herein, including combining features from a tool and/or technique discussed with reference to one figure or configuration in a tool and/or technique discussed with reference to a different figure and/or configuration. Also, a heating apparatus may include means for performing each of the acts or functions discussed in the context of the techniques discussed herein, in different combinations.

Examples of tools and techniques can include a heating apparatus that can include a fire cage including multiple porous walls around a cage space. The fire cage can be designed to contain heated fuel (such as heated fuel that includes hot coals) in the cage space. The heated fuel may or may not include fuel that is actively burning to produce visible flames. The heating apparatus can also include a container configured to be supported by the fire cage at a container position, wherein the container is above at least a portion of the cage space. The container can be designed to hold burning fuel above the heated fuel.

With the container in the container position, at least a portion of the container can be positioned at or above a top of the fire cage, such as at least substantially at a top of the fire cage.

The heating apparatus can be designed so that with the container in the container position, flames from the burning fuel extend above the fire cage.

The container can include porous side walls.

The heating apparatus can further include the heated fuel in the cage space, and the burning fuel can be held by the container above the heated fuel. Flames from the burning fuel may be at least partially above the fire cage.

The container can be a tray, and the fire cage may be a wire cage.

The heating apparatus can include a base that is designed to support the fire cage.

The container position can be a first container position. Also, the base can be designed to support the container in a second container position below the fire cage.

The heating apparatus can include a base sheet designed to be supported by the base with a heat source below the base sheet. The base, the heat source, and the base sheet can be designed to form a food grill that does not require use of the fire cage.

The heat source can include the container, with the base being configured to support the container below the base sheet.

The container position can be a first container position. Also, the fire cage can include supports extending into the cage space from the porous walls, the supports being designed to support opposite sides of the container in a second container position in the cage space below the first container position.

The heating apparatus can include an additional container designed to be supported by the fire cage along a wall of the fire cage outside of the cage space. The heating apparatus can include a stand designed to support the additional container, and the stand can be separate from the fire cage.

The additional container can contain thermal storage elements. Alternatively, the additional container can contain liquid suitable for human consumption (i.e., a drink).

The additional container can be a vertical grill.

The heating apparatus can include solid sheets configured to be removably supported against the fire cage. The solid sheets can be configured to substantially cover the porous walls and a top of the fire cage.

The heating apparatus can be configured to form a food smoker with the solid sheets substantially enclosing the porous walls and top of the fire cage.

Figure 15:
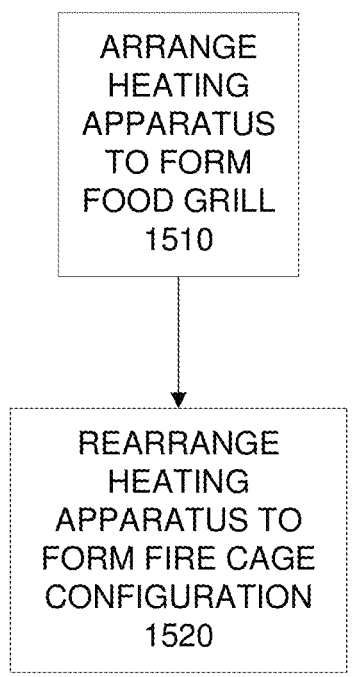
FIG. 15 is a flowchart of a heating apparatus technique.

Referring now to FIG. 15, a technique can include arranging 1510 a heating apparatus to form a food grill. The food grill can include a base, and the base can support a base sheet above a heat source. For example, this arranging may include placing the food grill components at an appropriate place for grilling food, or providing a heat source (e.g., providing a source of electricity, a source of fluid fuel, or a source of solid fuel). This arranging may also include assembling at least some components of the heating apparatus as a food grill. The technique can also include rearranging 1520 the heating apparatus to form a fire cage configuration. The fire cage configuration can include the base and a fire cage, with the fire cage being supported by the base. The rearranging 1520 can include arranging components of the heating apparatus in a different configuration relative to each other, as compared to the arrangement of the food grill. For example, the food grill may not include the fire cage, so that rearranging 1520 may include placing the fire cage onto the base, so that the fire cage is supported by the base.

The technique of FIG. 15 may further include cooking food on the base sheet with the heating apparatus arranged to form the food grill.

The technique of FIG. 15 may include placing fuel in the fire cage and burning the fuel in the fire cage.

Also, the technique of FIG. 15 may include burning fuel in a container that is supported by the fire cage and positioned above at least a portion of a cage space defined by the fire cage. The burning fuel can produce a flame while heated coals are in the cage space below the container.

The technique of FIG. 15 may also include producing heated fuel in the fire cage of the heating apparatus in a first location. The technique can also include placing a thermal store in a heat collecting position on a side of the fire cage, with the heated fuel inside the fire cage heating the thermal store in the heat collecting position. The thermal store can be moved away from the fire cage after the heated fuel inside the fire cage has heated the thermal store in the heat collecting position. The thermal store can be positioned in a second location away from the fire cage, with the thermal store heating air around the second location, such as in a tent, so that the heating apparatus can work as a space heater.

The technique of FIG. 15 may include burning fuel in a container that is supported by the fire cage and positioned above at least a portion of a cage space defined by the fire cage. The burning fuel can produce a flame while the heated fuel is in the cage space below the container.

Figure 16:
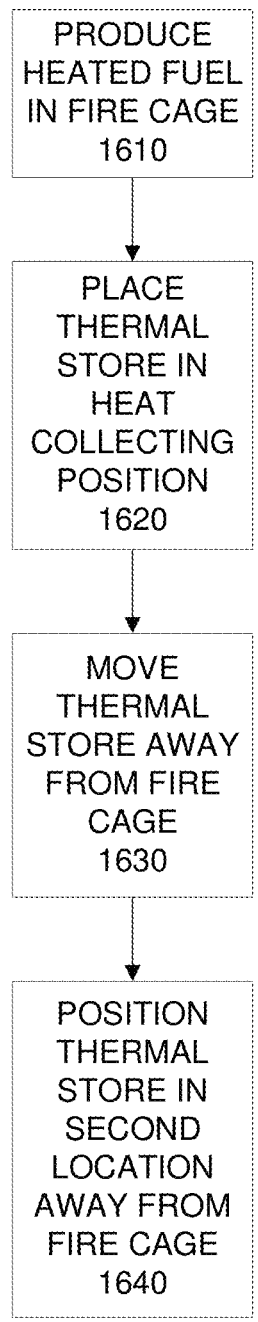
FIG. 16 is a flowchart of another heating apparatus technique.

Referring now to FIG. 16, another technique will be discussed. The technique of FIG. 16 can include producing 1610 heated fuel in a fire cage of a heating apparatus in a first location (such as heating the fuel by combustion of the heated fuel within the fire cage (e.g., to produce hot coals), and/or by combustion of the heated fuel outside the fire cage and then placing the heated fuel in the fire cage). A thermal store can be placed 1620 in a heat collecting position on a side of the fire cage. The heated fuel inside the fire cage can heat the thermal store while the thermal store is in the heat collecting position. The thermal store can be moved 1630 away from the fire cage after the heated fuel inside the fire cage has heated the thermal store in the heat collecting position. The thermal store can be positioned 1640 in a second location away from the fire cage. While in the second location, the thermal store can emit thermal energy to heat air around the second location.

The thermal store can be supported by the heating apparatus in the heat collecting position, such as by being mounted on a side of the fire cage.

Positioning 1640 the thermal store in the second location can include positioning the thermal store on a stand that is separable from the thermal store.

The thermal store can include a container holding thermal storage elements. For example, the thermal storage elements can include one or more of rocks and gravel.

The container holding the thermal storage elements can include copper, such as pure copper or a copper alloy.

The subject matter defined in the appended claims is not necessarily limited to the benefits described herein. A particular implementation of the invention may provide all, some, or none of the benefits described herein. Although acts for the various techniques are described herein in a particular, sequential order for the sake of presentation, it should be understood that this manner of description encompasses rearrangements in the order of acts, unless a particular ordering is required. For example, acts described sequentially may in some cases be rearranged or performed concurrently. Techniques described herein with reference to flowcharts may be used with one or more of the apparatuses described herein and/or with one or more other apparatuses. Moreover, for the sake of simplicity, flowcharts may not show the various ways in which particular techniques can be used in conjunction with other techniques.

While particular embodiments are discussed above, it will be understood by those skilled in the art that various changes in form and details may be made therein without departing from the spirit and scope of the invention.

I claim:

1. A heating apparatus comprising:
    a fire cage comprising multiple porous walls around a cage space, the fire cage being designed to contain heated fuel in the cage space;
    a container configured to be supported by the fire cage at a container position wherein the container is above at least a portion of the cage space, the container being designed to hold burning fuel above the heated fuel; and
    a base, the base being designed to support the fire cage, wherein the container position is a first container position and wherein the base is designed to support the container in a second container position below the fire cage.

2. A heating apparatus comprising:
    a fire cage comprising multiple porous walls around a cage space, the fire cage being designed to contain heated fuel in the cage space;
    a container configured to be supported by the fire cage at a container position wherein the container is above at least a portion of the cage space, the container being designed to hold burning fuel above the heated fuel;
    a base, the base being designed to support the fire cage; and
    a base sheet designed to be supported by the base with a heat source below the base sheet so that the base, the heat source, and the base sheet are designed to form a food grill that does not require use of the fire cage, wherein the heat source comprises the container, with the base being configured to support the container below the base sheet.

3. A heating apparatus comprising:
    a fire cage comprising multiple porous walls around a cage space, the fire cage being designed to contain heated fuel in the cage space;
    a first container configured to be supported by the fire cage at a container position wherein the first container is above at least a portion of the cage space, the first container being designed to hold burning fuel above the heated fuel; and
    a second container designed to be supported by the fire cage along a wall of the fire cage outside of the cage space.

4. The heating apparatus of claim 3, further comprising a stand designed to support the second container, the stand being separate from the fire cage.

5. The heating apparatus of claim 4, wherein the second container contains thermal storage elements.

6. The heating apparatus of claim 4, wherein the second container contains liquid suitable for human consumption.

7. The heating apparatus of claim 4, wherein the second container is a vertical grill.

8. A heating apparatus comprising:
    a fire cage comprising multiple porous walls around a cage space, the fire cage being designed to contain heated fuel in the cage space;
    a container configured to be supported by the fire cage at a container position wherein the container is above at least a portion of the cage space, the container being designed to hold burning fuel above the heated fuel; and
    solid sheets configured to be removably supported against the fire cage, wherein the solid sheets are configured to substantially cover the porous walls and a top of the fire cage.

9. The heating apparatus of claim 8, wherein the heating apparatus is configured to form a food smoker with the solid sheets substantially enclosing the porous walls and top of the fire cage.

* * * * *